INVENTOR
RICHARD S. J. GOOD
BY
ATTORNEY

United States Patent Office 3,444,751
Patented May 20, 1969

---

3,444,751
PARALLEL GEAR TRAINS WITH MEANS FOR ELIMINATING BACKLASH
Richard Samuel Jonathan Good, Mountsorrel, England, assignor to Marwin Machine Tools Limited, Anstey, England
Filed Sept. 1, 1967, Ser. No. 665,084
Claims priority, application Great Britain, Sept. 6, 1966, 39,832/66
Int. Cl. F16h 1/28
U.S. Cl. 74—409                                 3 Claims

ABSTRACT OF THE DISCLOSURE

A gear box incorporating a pair of parallel gear trains operable by a common drive shaft, the remote gear of one gear train being fixed upon a first output shaft while the remote gear of the second gear train is mounted for rotation about a second output shaft, and hydraulically operable means fixed on said second output shaft and being adapted for engaging said remote gear of said second gear train for eliminating backlash or slack within the gear box.

Background of the invention

The invention relates to the elimination of backlash in gear boxes which is important in machine tools which require the precise location of their components.

A gear box according to the invention has two gear trains in parallel including a gear rotatably journalled on a shaft, a cylinder block, a cam member having a number of cam faces, the cylinder block being fast on the shaft and rotatable with respect to the gear, and the cam member being fast on the gear and rotatable with respect to the shaft opposite to the cylinder block, and pistons bearing on the cam faces and slideable in the cylinder block so that when hydraulic pressure is applied to the faces of the pistons a torque is generated between the gear and the shaft. Thus backlash can be eliminated by the application of pressure to the pistons so that the cylinder block or drum acts as a hydraulic motor of limited stroke, the pistons as cam driving means, and any slack is taken up by the rotation of the gear and/or the shaft in opposite senses. The two gear trains are in general duplicates.

The pistons may have rollers in contact with the cam faces depending on their mutual arrangement. One or more cam faces and an equal number of pistons may be provided, the actual number being determined from design considerations such as the torque it is desired to exert and the power available. The shaft on which the gear train is journalled is similarly selected as in general any shaft in a gear box may be selected. The power may be electromagnetic or pneumatic but is preferably hydraulic and coordinated with the remainder of the machine control system. The gear referred to above, which is identified hereinafter as "the said one gear" should be mounted with axial thrust washers so that it is retained but can rotate under the action of the cam driving means.

The invention is illustrated by way of example in the accompanying drawings of which:

Figure 1:
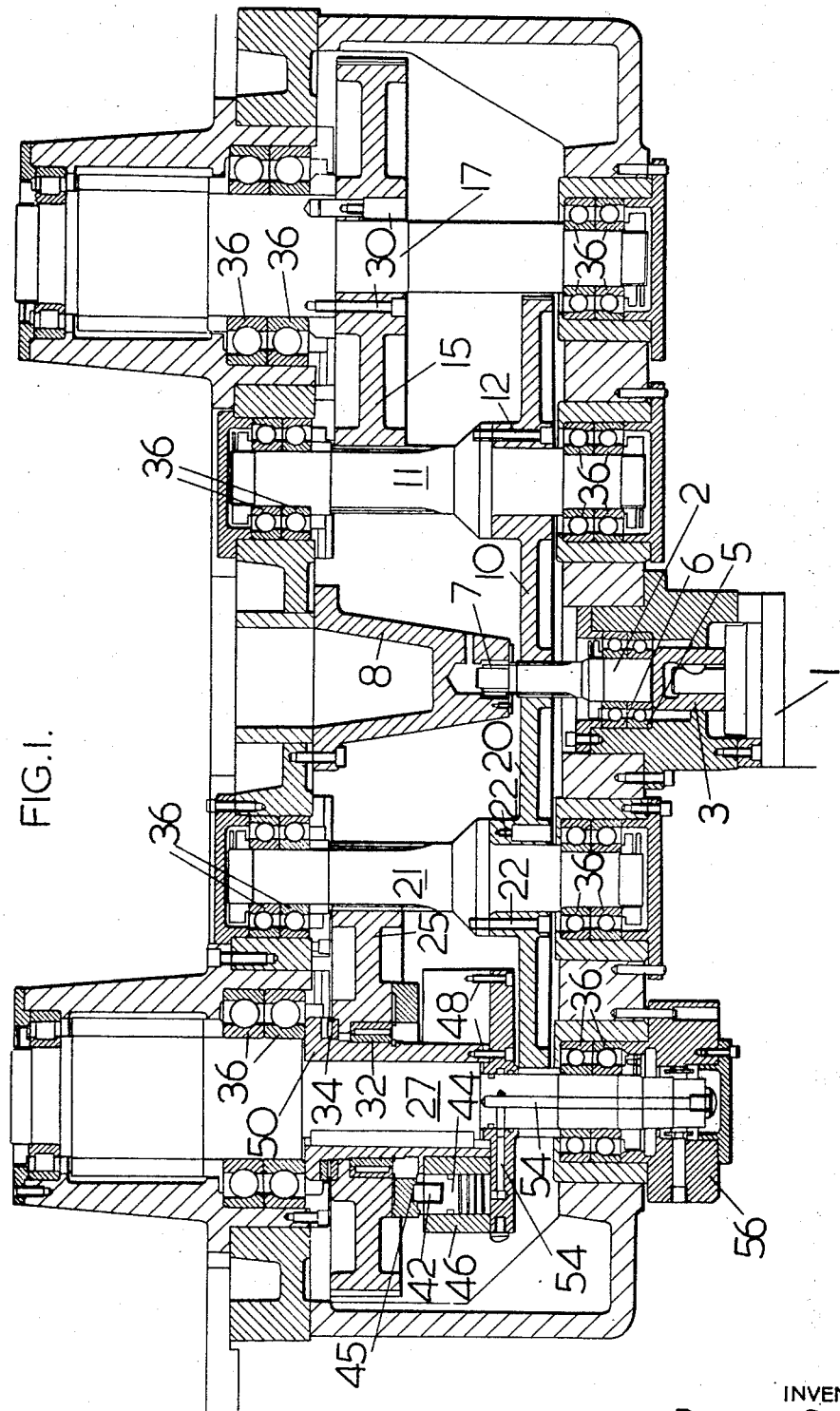
FIGURE 1 is a section through a gear box according to the invention.
Figure 3:
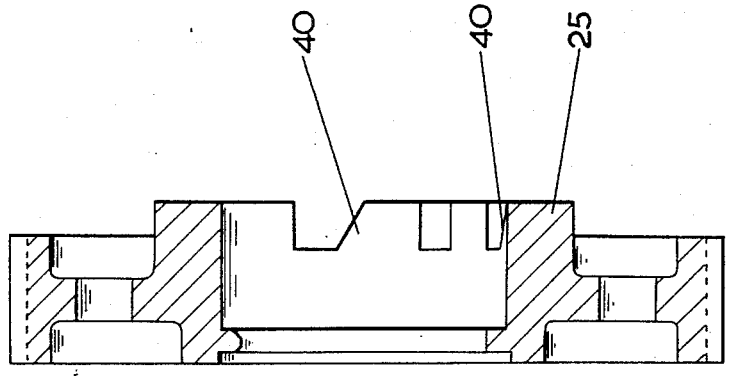
FIGURE 3 is a section on 3—3 of FIGURE 2.

The general arrangement of the gear box shown in FIGURE 1 is that a hydraulic motor 1 is connected to an input shaft 2 through a coupling 3. The input shaft 2 is mounted in bearings 5, 6 and in an end bearing 7 mounted in a housing 8. The input shaft 2 meshes with main gears 10, 20 which are secured to duplicate lay shafts 11, 21 by bolts 12, 22. The lay shafts 11, 21 mesh with secondary gears 15, 25 which are mounted on duplicate output shafts 17, 27, the gear 15 being held fast on the shaft 17 by bolts 30, and the gear 25 being journalled on the shaft 27 with radial bearings 32 and axial thrust bearings 34. The output shafts 17, 27 each carry a gear wheel (not shown) for engaging a load, for example a rack or pinion. The shafts 11, 21, 17, 27 are mounted in the gearbox casing in bearings 36.

Figure 2:
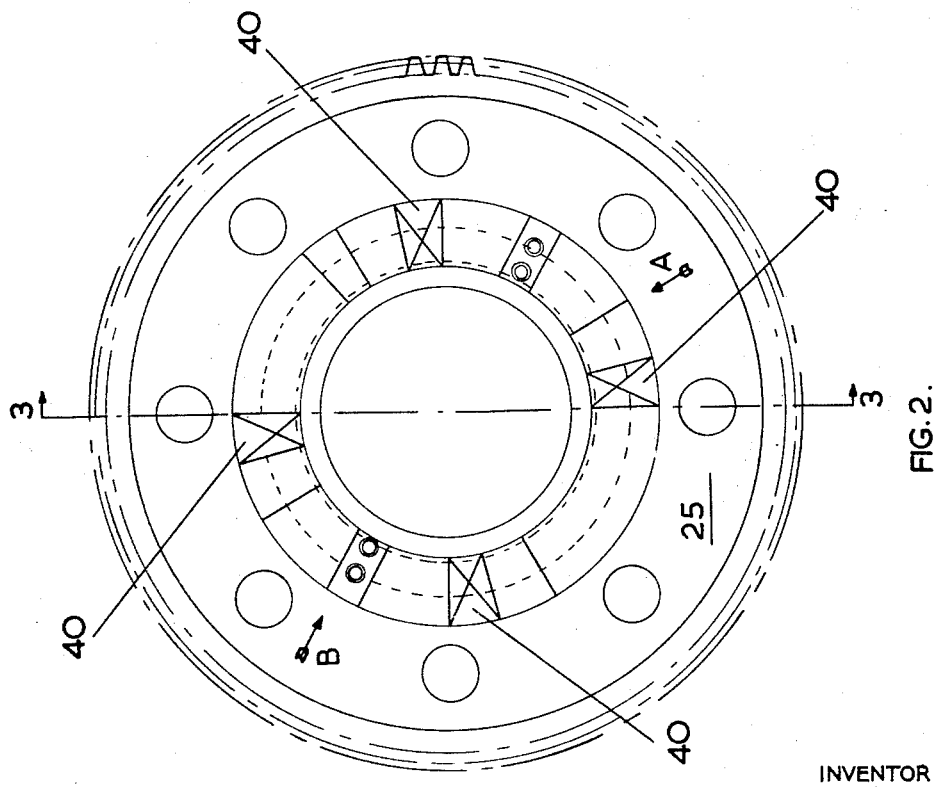
FIGURE 2 is a plan view of "the said one gear" in FIGURE 1.
Figure 4:
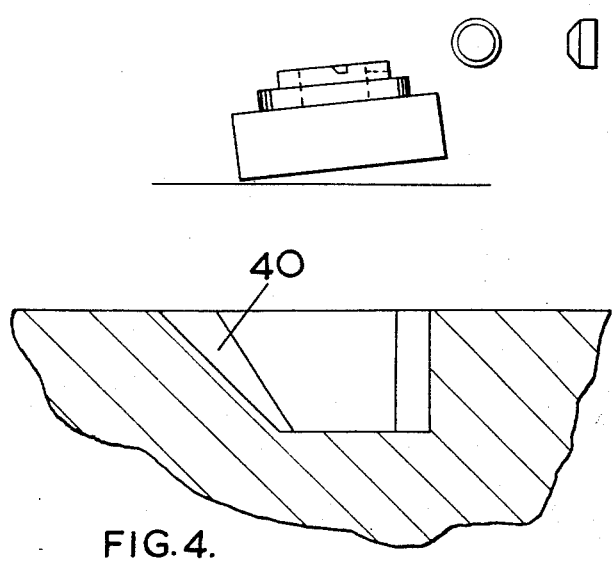
FIGURE 4 is a scrap view on arrow A of FIGURE 2 showing how the cam face is cut with a dividing head.
Figure 5:
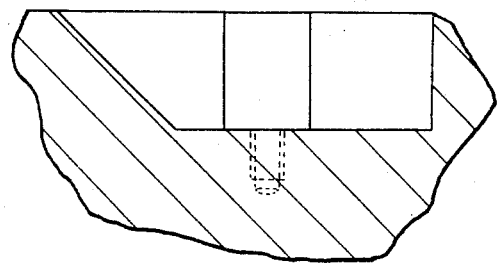
FIGURE 5 is a scrap view on arrow B of FIGURE 2.

"The said one gear" illustrated in FIGURE 2 is that referred to as 25. It has four cam faces 40 capable of engagement with rollers 42 mounted in the ends of pistons 44 mounted in a drum 46 (FIGURE 1). The drum 46 is bolted by bolts 48 onto a hub 50 which is keyed on the shaft 27. The heads of the pistons 44 are connected through a conduit 54 and a running joint 56 to the main hydraulic circuitry.

When hydraulic pressure is applied to the conduit 54 with the gear box slack, the pistons are moved out of the drum 46 and the rollers 42 bear upon the cam faces 40. The output shaft 27 and the secondary gear 25 are thus rotated in opposite senses. As the rotation continues slack is taken up throughout the system from the gear 25 to the lay shaft 21, to the main gear train 20, to the input shaft 2, to the main gear train 10, to the lay shaft 11, to the secondary gear 15, to the output shaft 17. Thus the output shafts 17 and 27 are preloaded with torque in opposite senses. The torque is made larger than the power of the motor 1 so that rotation can be transmitted through the gear box in either sense without backlash.

Figure 6:
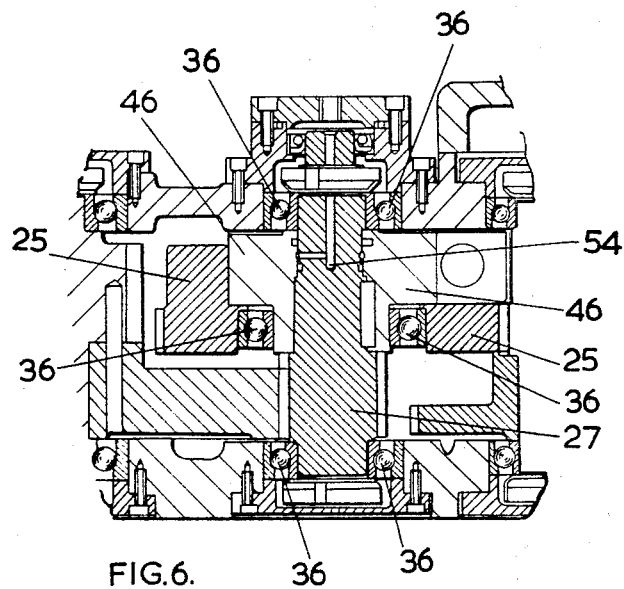
FIGURE 6 is a scrap section through a different gear box according to the invention.
Figure 7:
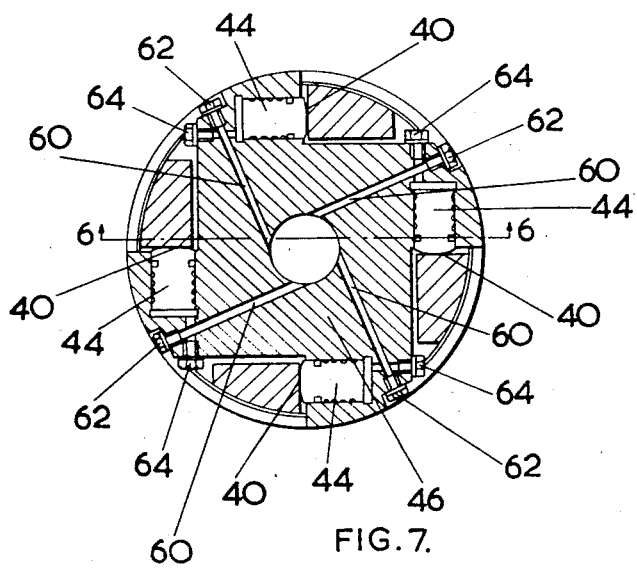
FIGURE 7 is a section perpendicular to FIGURE 6.

The gear box shown in scrap section in FIGURE 6 is identical in all other respects to that shown in FIGURES 1 to 5 so that FIGURE 6 corresponds to FIGURE 1 and the same reference numerals have been used as far as possible to indicate corresponding parts. In this case also "the said one gear" 25 has four cam faces 40 capable of engagement directly with pistons 44 mounted in a drum 46 (FIGURE 7) but in a plane perpendicular to those in FIGURE 1. The drum 46 is keyed on the shaft 27. The heads of the pistons 44 are connected through passageways 60 having plugs 62 and bleed screws 64 to a duct 54 in the shaft 27. Operation of this embodiment is the same as the other.

What I claim is:
1. A gear box having two gear trains in parallel including a gear rotatably journalled on a shaft, a cylinder block, a cam member having a number of cam faces, the cylinder block being fast on the shaft and rotatable with respect to the gear, and the cam member being fast on the gear and rotatable with respect to the shaft opposite to the cylinder block, and pistons bearing on the cam faces and slideable in the cylinder block so that when hydraulic pressure is applied to the faces of the pistons a torque is generated between the gear and the shaft.

2. A gear box according to claim 1 in which the pistons bear on the cam faces through rollers and are slideable perpendicular to the plane of the gear.

3. A gear box according to claim 1 in which the pistons bear directly on the cam faces and are slideable in the plane of the gear.

References Cited

UNITED STATES PATENTS

| | | | |
|---|---|---|---|
| 2,440,901 | 5/1948 | Larson | 74—409 |
| 2,737,056 | 3/1956 | Baumgartner | 74—409 |
| 2,920,497 | 1/1960 | Wiken | 74—409 X |
| 2,946,232 | 7/1960 | Jones | 74—409 |
| 2,995,046 | 8/1961 | Mansachs | 74—409 X |

LEONARD H. GERIN, *Primary Examiner.*

U.S. Cl. X.R.

74—665